United States Patent
Mian

(10) Patent No.: US 7,298,548 B2
(45) Date of Patent: Nov. 20, 2007

(54) MULTI-DIRECTIONAL VIEWING AND IMAGING

(75) Inventor: Zahid F. Mian, Loudonville, NY (US)

(73) Assignee: International Electronic Machines Corp., Albany, NY (US)

( * ) Notice: Subject to any disclaimer, the term of this patent is extended or adjusted under 35 U.S.C. 154(b) by 0 days.

(21) Appl. No.: 11/205,242

(22) Filed: Aug. 16, 2005

(65) Prior Publication Data

US 2006/0033985 A1 Feb. 16, 2006

Related U.S. Application Data

(60) Provisional application No. 60/601,627, filed on Aug. 16, 2004.

(51) Int. Cl.
*G02B 17/00* (2006.01)
(52) U.S. Cl. ................................. 359/366; 359/866
(58) Field of Classification Search ................ 359/366, 359/866, 725
See application file for complete search history.

(56) References Cited

U.S. PATENT DOCUMENTS

| 3,044,379 | A | * | 7/1962 | Bouwers ...................... 396/22 |
|---|---|---|---|---|
| 4,514,630 | A | * | 4/1985 | Takahashi .................... 250/342 |
| 4,670,648 | A | | 6/1987 | Hall et al. |
| 5,187,667 | A | | 2/1993 | Short |
| 5,305,035 | A | * | 4/1994 | Schonherr et al. ............ 396/22 |
| 5,359,363 | A | | 10/1994 | Kuban et al. |
| 5,473,474 | A | * | 12/1995 | Powell ........................ 359/725 |
| 5,539,483 | A | | 7/1996 | Nalwa |
| 5,760,826 | A | * | 6/1998 | Nayar ........................... 348/36 |
| 5,854,713 | A | * | 12/1998 | Kuroda et al. .............. 359/850 |
| 6,375,366 | B1 | * | 4/2002 | Kato et al. ................... 396/351 |
| 6,646,818 | B2 | * | 11/2003 | Doi ............................. 359/725 |
| 6,809,887 | B1 | * | 10/2004 | Gao et al. .................... 359/725 |
| 6,963,375 | B1 | * | 11/2005 | Lundberg .................... 348/335 |
| 7,176,960 | B1 | * | 2/2007 | Nayar et al. ........... 348/207.99 |
| 2002/0085271 | A1 | * | 7/2002 | Shafer et al. ................ 359/359 |

OTHER PUBLICATIONS

Yagi, Yasushi et al., "Evaluating Effectivity of Map Generation by Tracking Vertical Edges in Omnidirectional Image Sequence," IEEE International Conference on Robotics and Automation, Jun. 1995, pp. 2334-2339.

Yagi, Yasushi et al., "Map-Based Navigation for a Mobile Robot with Omnidirectional Image Sensor COPIS," IEEE Transactions on Robotics and Automation, vol. 11, No. 5, Oct. 1995, pp. 634-648.

(Continued)

*Primary Examiner*—Stephone B. Allen
*Assistant Examiner*—Lee Fineman
(74) *Attorney, Agent, or Firm*—Hoffman, Warnick & D'Alessandro, LLC

(57) ABSTRACT

A solution for directing electromagnetic radiation, such as visible light, from multiple fields of view in differing directions to a single view point is provided. The radiation received from one or more fields of view is directed onto a first reflective surface, the radiation reflected off of the first reflective surface is then directed to a view point that comprises a transparent portion of the first reflective surface. In this manner, the invention enables the viewing and/or imaging of the radiation from any location in the full panorama at a single location.

19 Claims, 7 Drawing Sheets

OTHER PUBLICATIONS

Yamazawa, Kazumasa et al., "Obstacle Detection with Omnidirectional Image Sensor HyperOmni Vision," IEEE International Conference on Robotics and Automation, Oct. 1995, pp. 1062-1067.

Nayar, Shree K., "Catadioptric Omnidirectional Camera," Proceedings of the 1997 Conference on Computer Vision and Pattern Recognition (CVPR '97), IEEE Computer Society 1997, pp. 482-488.

* cited by examiner

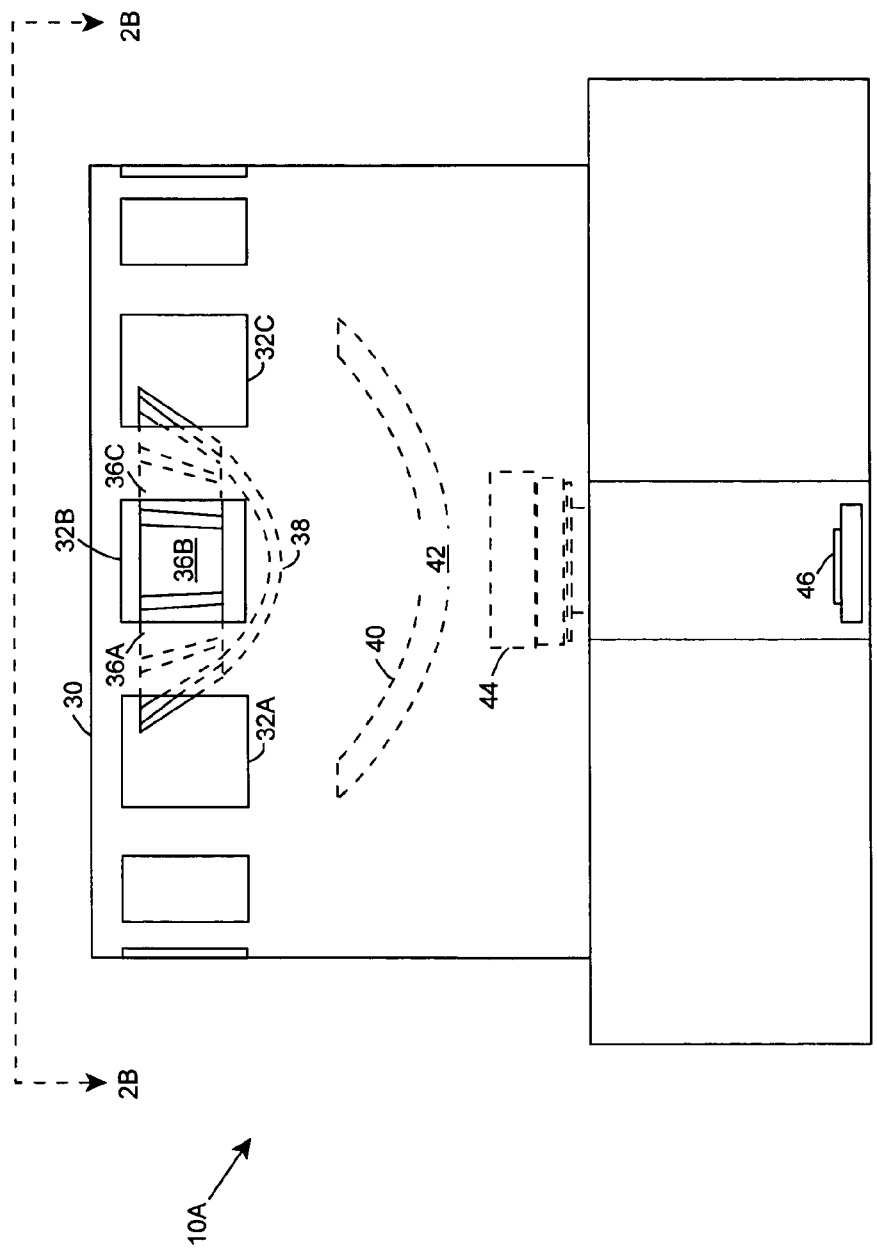

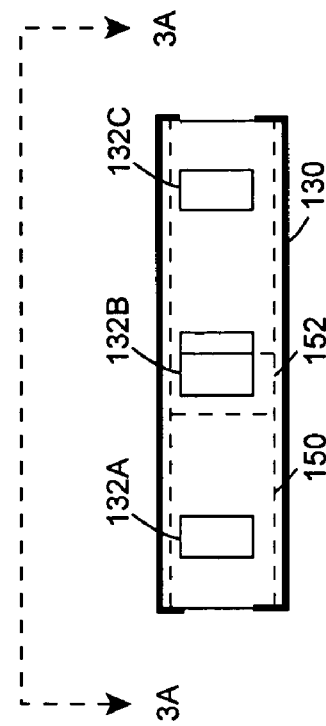
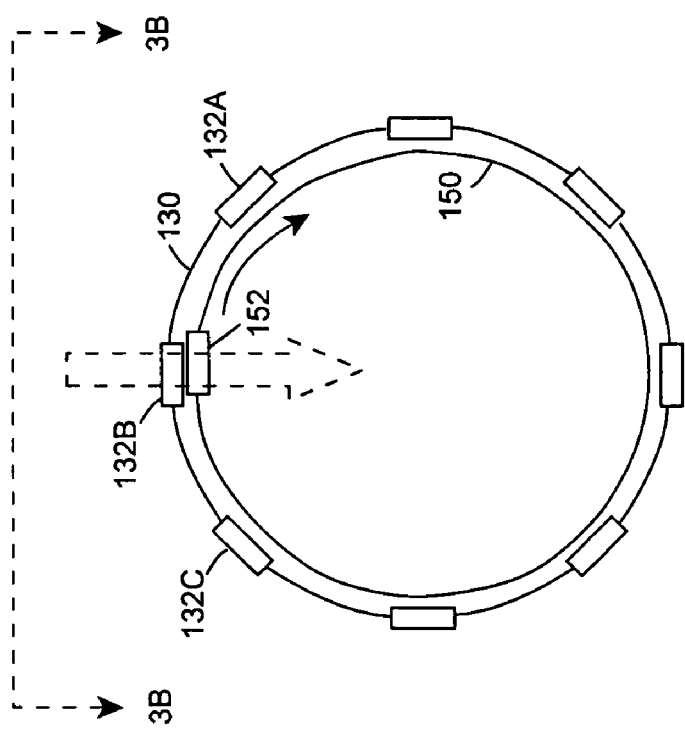

MULTI-DIRECTIONAL VIEWING AND IMAGING

REFERENCE TO PRIOR APPLICATION

The current application claims the benefit of U.S. Provisional Application No. 60/601,627, filed on Aug. 16, 2004 and entitled "System and method for omnidirectional viewing through synthetic field of view", which is hereby incorporated herein by reference.

GOVERNMENT LICENSE RIGHTS

The U.S. Government has a paid-up license in this invention and the right in limited circumstances to require the patent owner to license others on reasonable terms as provided for by the terms of SBIR Contract Number M67854-04-C-1022 awarded by the United States Marine Corps.

BACKGROUND OF THE INVENTION

1. Technical Field

The invention relates generally to multi-directional viewing and imaging, and more specifically, to a solution that enables viewing and/or imaging from any and all directions with few or no moving parts.

2. Background Art

In general, there are four approaches to obtaining a panoramic view of an area. In a first approach, a rotating camera is used. This approach is used in many areas to cover both full panoramas as well as fields of view of less than three hundred sixty degrees. When compared to other approaches, the rotating camera is relatively low cost, simple, provides intuitive operation, provides a known performance, is a known technology, provides minimal distortion of the imaged area, and can provide excellent resolution. Additionally, the rotating camera provides a single point-of-view, which can be important in certain applications, such as machine vision or targeting. However, the rotating camera is limited by the requirement to rotate the camera, an inability to view the entire panorama at once, a need to assemble (e.g., "stitch together") individual images to obtain the full panorama, and a time limitation on how quickly a particular portion of the field of view may be accessed on demand.

In a second approach, a camera cluster (e.g., multiple cameras whose fields of view are combined) are used to produce a single panoramic image. For example, ten cameras, each having a field of view that covers approximately one-tenth of the panorama, theoretically can be used to view the entire panorama at once. In practice, some overlap is generally included in the fields of view. This approach provides the advantages of an intuitive design, provides a known performance, is a known technology, provides minimal distortion of the images area, and can provide excellent resolution. However, this approach also requires the assembly of multiple images, has a higher cost compared to the rotating camera, and each camera comprises a unique point of view.

In a third approach, a panoramic (e.g., "fish-eye") lens is used. The panoramic lens increases the field of view of a particular camera, thereby reducing a number of cameras needed or a required amount of movement to obtain a panoramic view. Additionally, use of the panoramic lens enables a more simplistic solution, and avoids blind spots in the field of view. However, panoramic lenses generally are more expensive, are relatively heavy and bulky as compared to standard optics, and images having relatively large fields of view include greater distortion, particularly at the edges. The distortion effectively creates multiple points of view in most panoramic lens-based solutions. Additionally, using the same imaging hardware, panoramic lens-based solutions have inherently inferior resolution to that of a camera cluster or a rotating camera since the entire panorama is mapped to a single imaging device.

In a fourth approach, one or more mirrors are used to increase the field of view. In general, this approach requires no moving parts, a simultaneous apprehension of the entire panorama, and a physically simple design. For example, one mirror-based approach uses multiple planar mirrors in conjunction with multiple charge coupled device ("CCD") cameras to obtain a full panoramic image. In this approach, four planar mirrors are arranged in a pyramidal shape with one camera positioned above each of the four planar mirrors to obtain the panoramic image. However, this approach requires multiple cameras and suffers from distortion at the "seams" when the separate images are combined to yield the panoramic view.

Other mirror-based approaches have used curved mirrors in conjunction with image sensors to provide an omnidirectional view. Hyperbola and ellipsoid reflective surfaces possess a single viewpoint in perspective projection when carefully designed and implemented. One approach provides a conical projection image sensor (COPIS) that uses a conical reflecting surface to gather images from the surrounding environment. The images can be processed to guide the navigation of a mobile robot. Although COPIS is able to attain full panoramic viewing, it is not a true omnidirectional image sensor since the field of view is limited by the vertex angle of the conical mirror and by the viewing angle of the camera lens. Furthermore, reflection off the curved surface results in multiple viewpoints, as the locus of viewpoints for a cone is a circle. Multiple viewpoints cause significant distortion and require complex manipulation and translation of the image to reconstruct the scene as viewed from a single viewpoint.

A proposed improvement to COPIS uses a hyperboloidal mirror in place of the conical surface. In this case, the rays of light which are reflected off the hyperboloidal surface, no matter where the point of origin, converge at a single point, thus enabling perspective viewing. Although the use of a hyperboloidal mirror enables full perspective image sensing, since the rays of light that make up the reflected image converge at the focal point of the reflector, the position of the sensor relative to the reflecting surface is critical, and any disturbance will impair the image quality. Further, the use of a perspective projection model inherently requires that as the distance between the sensor and the mirror increases, the cross section of the mirror must increase. Therefore, practical considerations dictate that in order to keep the mirror at a reasonable size, the mirror must be placed close to the sensor. This in turn causes complications with respect to the design of the image sensor optics. In addition, mapping the sensed image to usable coordinates requires complex calibration due to the nature of the converging image.

As a result, a need exists for an improved omnidirectional viewing/imaging solution that addresses one or more of these limitations and/or other limitation(s) not expressly discussed herein.

SUMMARY OF THE INVENTION

The invention provides a solution for directing electromagnetic radiation, such as visible light, from multiple fields of view in differing directions to a single view point. The radiation received from one or more fields of view is directed onto a first reflective surface, the radiation reflected off of the first reflective surface is then directed to a view point that comprises a transparent portion of the first reflective surface. In this manner, the invention enables the viewing and/or imaging of the radiation from any direction in the full panorama at a single location. To this extent, the invention can be implemented as part of an imaging system and/or viewing system. Additionally, the invention provides a method of generating a panoramic image by capturing an image for each of the fields of view and subsequently combining the images to generate the panoramic image.

A first aspect of the invention provides a method of directing electromagnetic radiation from at least one of a plurality of fields of view to a view point, the method comprising: directing electromagnetic radiation received from the at least one of a plurality of fields of view onto a first reflective surface; and directing electromagnetic radiation reflected off of the first reflective surface to the view point, wherein the view point comprises a transparent portion of the first reflective surface.

A second aspect of the invention provides a system for directing electromagnetic radiation from at least one of a plurality of fields of view to a view point, the system comprising: means for directing electromagnetic radiation received from the at least one of a plurality of fields of view onto a concave reflective surface; and a convex reflective surface for directing electromagnetic radiation reflected off of the concave reflective surface to the view point, wherein the view point comprises a transparent portion of the concave reflective surface.

A third aspect of the invention provides a method of generating an image, the method comprising: directing electromagnetic radiation received from at least one of a plurality of fields of view onto a first reflective surface; directing electromagnetic radiation reflected off of the first reflective surface to a view point, wherein the view point comprises a transparent portion of the first reflective surface; and generating the image based on the electromagnetic radiation.

A fourth aspect of the invention provides a panoramic imaging system comprising: means for directing electromagnetic radiation received from at least one of a plurality of fields of view onto a first reflective surface; a second reflective surface for directing electromagnetic radiation reflected off of the first reflective surface to a view point, wherein the view point comprises a transparent portion of the first reflective surface; and means for generating an image based on the electromagnetic radiation.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which:

FIGS. 2A-B show side and top views, respectively, of an illustrative imaging system according to an embodiment of the invention.

FIGS. 3A-B show a top and side view, respectively, of an alternative casing according to an embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for directing electromagnetic radiation, such as visible light, from multiple fields of view in differing directions to a single view point. The radiation received from one or more fields of view is directed onto a first reflective surface, the radiation reflected off of the first reflective surface is then directed to a view point that comprises a transparent portion of the first reflective surface. In this manner, the invention enables the viewing and/or imaging of the radiation from any direction in the full panorama at a single location. To this extent, the invention can be implemented as part of an imaging system and/or viewing system. Additionally, the invention provides a method of generating a panoramic image by capturing an image for each of the fields of view and subsequently combining the images to generate the panoramic image.

Figure 1:
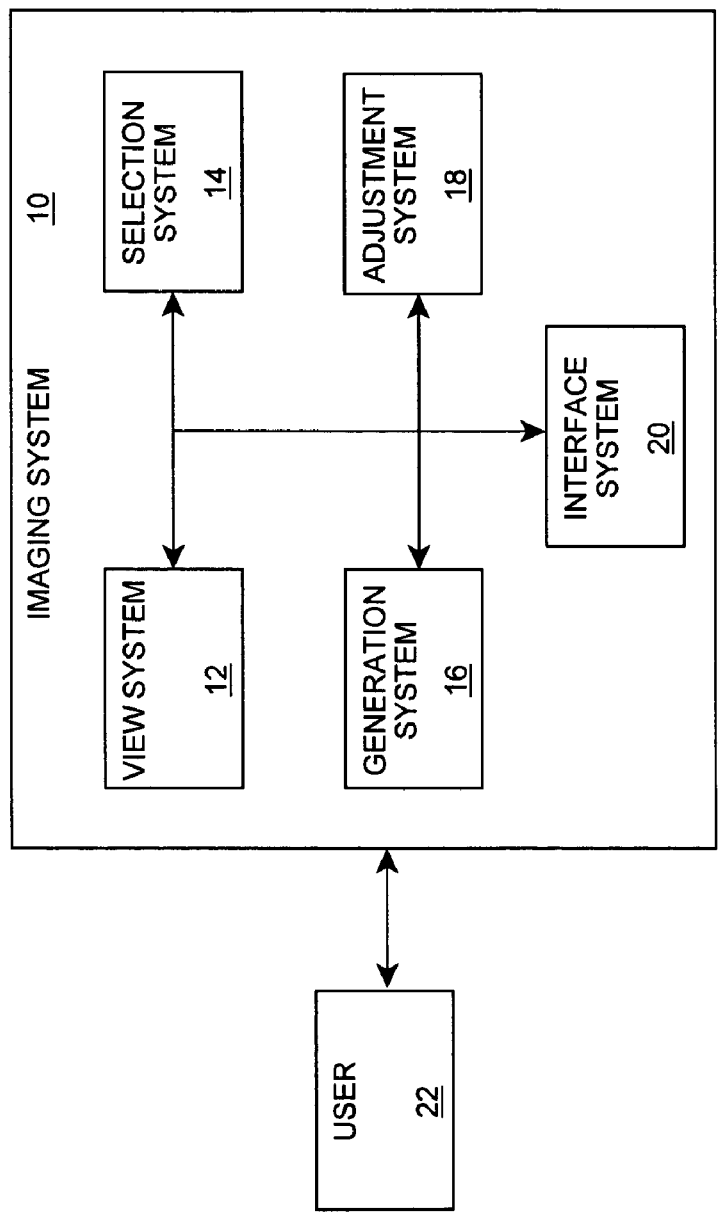
FIG. 1 shows a block diagram of an illustrative imaging system according to an embodiment of the invention.

Turning to the drawings, FIG. 1 shows a block diagram of an illustrative imaging system 10 according to an embodiment of the invention. As shown, imaging system 10 includes a view system 12 for directing electromagnetic radiation from one or more of a plurality of fields of view to a "view point". The view point comprises a location through which electromagnetic radiation from any of the fields of view passes. In one embodiment, the electromagnetic radiation comprises visible light. However, it is understood that electromagnetic radiation having any wavelength could be directed to the view point. To this extent, electromagnetic radiation could comprise a wavelength in one or more other spectra including near infrared, far infrared, ultraviolet, etc.

Further, imaging system 10 is shown including a selection system 14. Selection system 14 selects one or more of the plurality of fields of view from which electromagnetic radiation will be directed to the view point. In one embodiment, a combination of all of the plurality of fields of view comprises a panoramic (e.g., three hundred sixty degree) field of view. However, it is understood that the total field of view of all the fields of view can comprise any portion of the panorama. To this extent, one or more gaps in the panorama can be present in the plurality of fields of view.

Additionally, imaging system 10 includes a generation system 16 for generating one or more images based on the electromagnetic radiation, and an adjustment system 18 for adjusting a level of detail, such as resolution and/or magnification, for the one or more fields of view from which electromagnetic radiation is received. It is understood that the resolution and/or magnification of each image can comprise any desired resolution and/or magnification. Further, it is understood that generation system 16 can fix the image in any tangible form of expression that is perceptible with or without the aid of a machine or device, such as an electronic file, a print, etc. Imaging system 10 also includes an interface system 20 that enables a user 22 to operate one or more of the other systems in a known manner. For example, interface system 20 can comprise one or more input and/or output devices that enable user 22 to request one or more operations in imaging system 10. To this extent, user 22 could comprise an individual and/or another system, such as a computing device, that communicates with interface system 20 in a known manner.

Figure 2B:
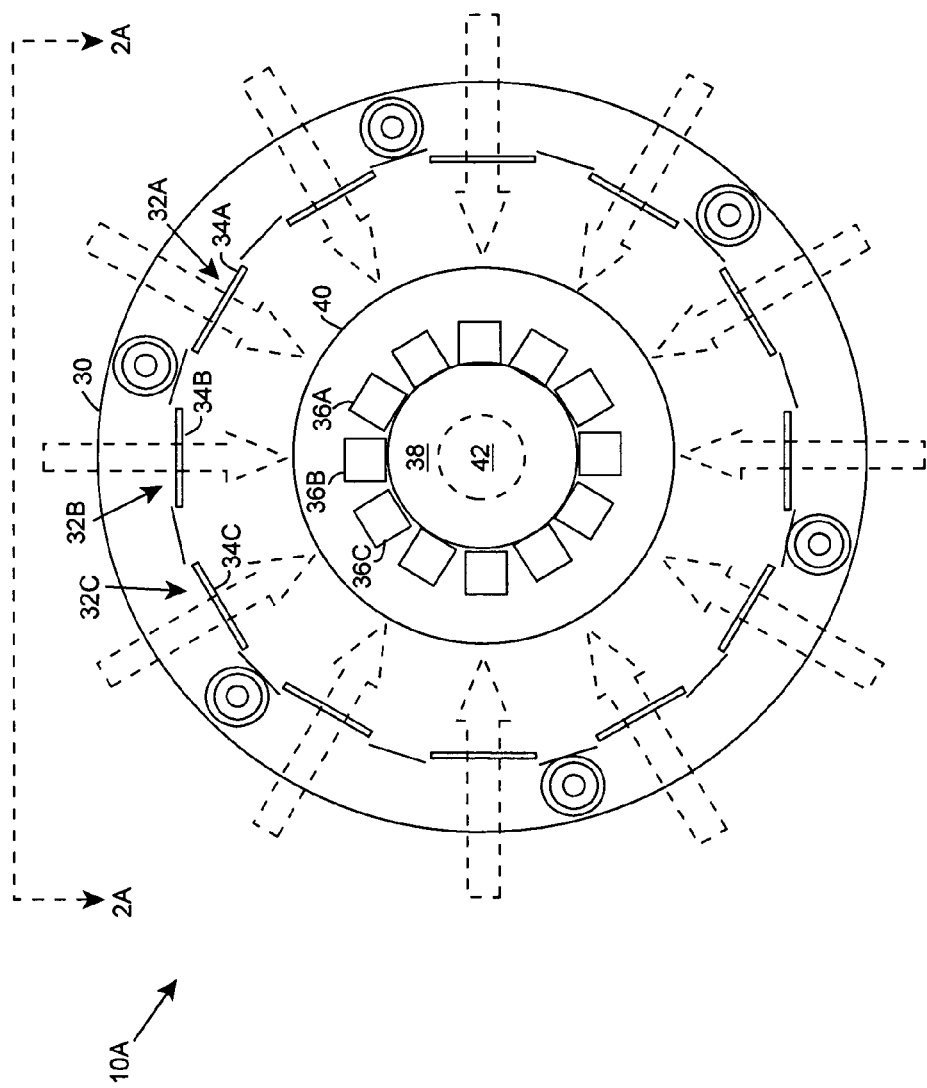

FIGS. 2A-B show side and top views, respectively, of an illustrative imaging system 10A according to an embodiment of the invention. Referring to FIGS. 2A-B, imaging system 10A includes a casing 30 that comprises a plurality of transparent openings, such as openings 32A-C. Each opening 32A-C allows electromagnetic radiation in a desired spectrum to pass therethrough. As shown, casing 30 can comprise a substantially circular structure and include a plurality (e.g., twelve) of openings 32A-C of approximately the same size and evenly spaced around the entire perimeter of casing 30. However, it is understood that this is only illustrative and imaging system 10A can comprise any desired arrangement and/or shape of casing 30 and/or openings 32A-C.

As noted previously, imaging system 10A can include a selection system 14 (FIG. 1) for selecting one or more of the fields of view (e.g., openings 32A-C) to image. To this extent, each opening can comprise a corresponding shade, such as shades 34A-C for openings 32A-C, respectively. Selection system 14 can selectively open one or more shades 34A-C for the opening 32A-C that corresponds to the selected field(s) of view. It is understood that openings 32A-C and shades 34A-C can comprise any known solution for selectively allowing and preventing electromagnetic radiation from passing therethrough. For example, each opening 32A-C can comprise a transparent panel (e.g., glass), an aperture in casing 30, or the like. Similarly, each shade 34A-C can comprise a shutter mechanism, such as a piezoelectric shutter, a rotating shutter, a mechanical shutter (e.g., similar to a camera), a cover, or the like. Further, each opening 32A-C and shade 34A-C combination can comprise a liquid crystal panel that may be made transparent or opaque based on an electrical signal. In any event, selection system 14 can operate shades 34A-C using any known solution.

Alternatively, selection system 14 (FIG. 1) can comprise a single mechanism for selectively allowing electromagnetic radiation to pass through one or more openings 32A-C. For example, FIGS. 3A-B show a top and side view, respectively, of an alternative casing 130 according to an embodiment of the invention. In this case, casing 130 is shown including a plurality of openings, such as openings 132A-C. A single rotating ring 150 that includes an opening 152 is located inside casing 130 at the same level as openings 132A-C. In operation, ring 150 can rotate in a desired direction, such as clockwise, so that opening 152 is periodically aligned with and allows electromagnetic radiation to pass through an opening 132A-C while ring 150 prevents electromagnetic radiation from passing through the remaining openings 132A-C. Opening 152 can be larger than each opening 132A-C. To this extent, the size of opening 152 and/or openings 132A-C, as well as a speed of shade 150 can be selected to enable electromagnetic radiation to pass through each opening 132A-C for a desired period of time. While shown with only a single opening 152, it is understood that ring 150 can comprise any number of openings 152.

In any event, returning to FIGS. 2A-B, imaging system 10A includes a view system 12 (FIG. 1) for directing electromagnetic radiation received from the field(s) of view to a view point 42. To this extent, view system 12 can comprise a plurality of reflective surfaces for directing the electromagnetic radiation to view point 42, e.g., angled mirrors. In particular, for each opening, imaging system 10A is shown including a corresponding reflective surface, such as reflective surfaces 36A-C for openings 32A-C, respectively. Additionally, imaging system 10A is shown including a first reflective surface 38 and a second reflective surface 40. The combination of reflective surfaces 36A-C, 38, and 40 operate to direct electromagnetic radiation from any field of view to view point 42.

Figure 4:
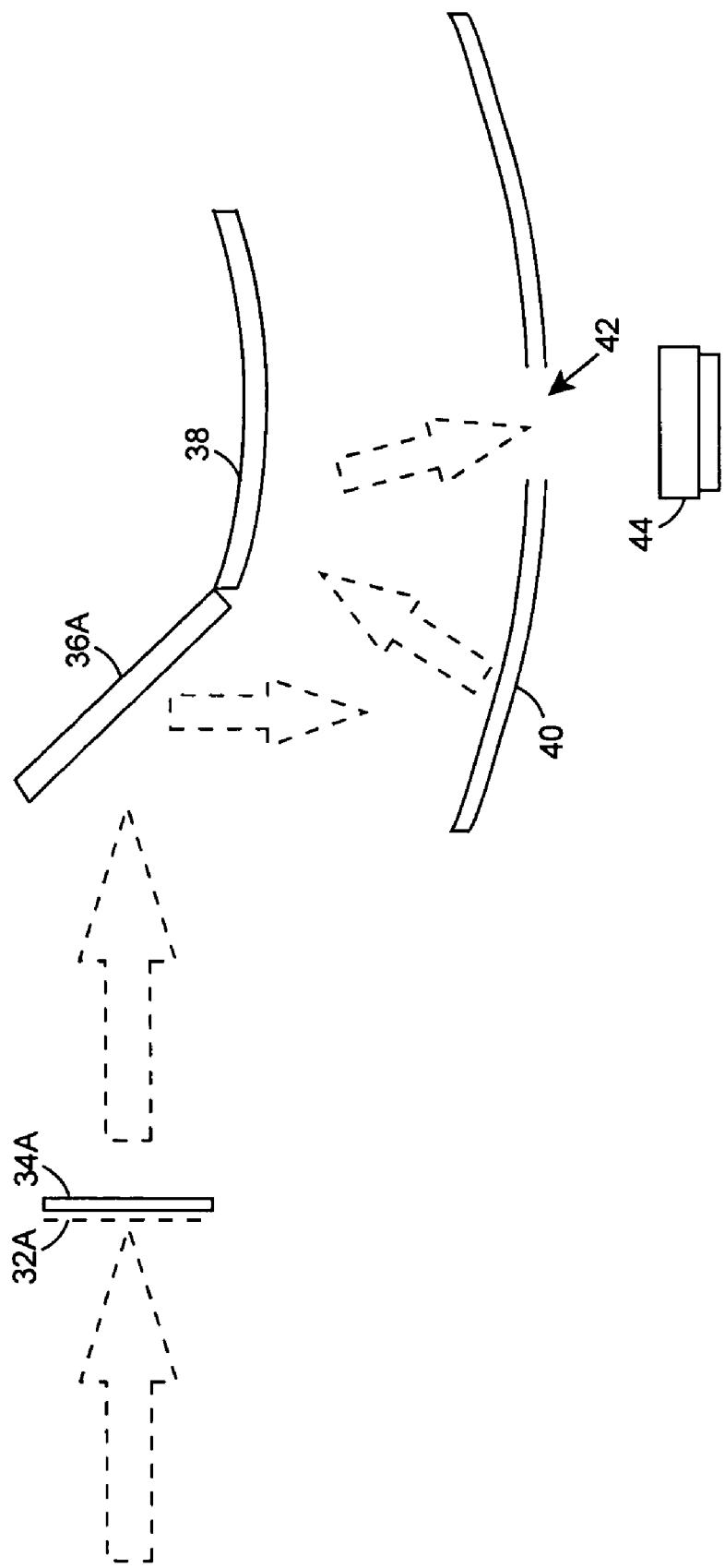
FIG. 4 shows a side view of several elements of the imaging system of FIGS. 2A-B to further illustrate the operation of the imaging system.

FIG. 4 shows a side view of several elements of imaging system 10A to further illustrate the operation of imaging system 10A. In particular, shade 34A can be open to allow electromagnetic radiation to pass through opening 32A. As electromagnetic radiation is received through opening 32A, it is impinged upon the corresponding reflective surface 36A, which directs the electromagnetic radiation onto a larger reflective surface 40. Reflective surface 40 then directs the electromagnetic radiation onto another smaller reflective surface 38, which in turn directs the electromagnetic radiation to view point 42. View point 42 can comprise an aperture in reflective surface 40 and/or an opening, such as an unsilvered region, in reflective surface 40 that allows the electromagnetic radiation to pass therethrough. As shown, reflective surface 36A comprises a substantially flat surface, reflective surface 40 comprises a concave surface, and reflective surface 38 comprises a convex surface. However, it is understood that alternative configurations are possible using any combination of flat and/or curved mirror segments to direct the electromagnetic radiation.

Returning to FIG. 1, it is understood that view system 12 and selection system 14 can be implemented apart from an imaging system 10. For example, an eyepiece or the like can be provided at or below view point 42 (FIG. 2A) to enable an individual to view visible light received from one or more selected fields of view. To this extent, view system 12 and selection system 14 could be implemented as a panoramic periscope that does not include any conventional moving parts. Further, one or more reflective surfaces could be included below view point 42 for directing the reflected electromagnetic radiation toward a projection location for projection by a projecting device and/or toward an imaging location for imaging by an imaging device.

When implemented independent of or as part of an imaging system 10, an adjustment system 18 can be included to adjust a level of detail for one or more of the fields of view. To this extent, returning to FIGS. 2A and 4, an illustrative objective lens 44 is shown located below view point 42. After passing through view point 42, the electromagnetic radiation will impinge upon objective lens 44. As is known in the art, objective lens 44 can comprise a focal length that is adjustable within a range (e.g., a zoom lens), thereby permitting an adjustable level of detail and/or focus for the field of view being viewed/imaged. Further, adjustment system 18 (FIG. 1) can adjust the level of detail digitally, e.g., using a digital zoom and/or adjusting a resolution used to store data for the image of the field of view.

When implemented as part of imaging system 10A, the invention further includes a generation system 16 (FIG. 1) for generating an image based on the electromagnetic radiation received and redirected from one or more fields of view. To this extent, imaging system 10A is shown including an imaging device 46. Imaging device 46 can be disposed below objective lens 44 such that the electromagnetic radiation will impinge upon a sensing portion of imaging device 46 after having passed through objective lens 44. Imaging device 46 can comprise any type of digital or analog imaging device, as is known in the art.

Further, generation system 16 (FIG. 1) can include one or more additional components to provide additional functionality. For example, in one embodiment, generation system 16 comprises a system for generating a panoramic image. It is understood that the process steps for generating the panoramic image can be implemented using any now known or later developed solution including, for example, any combination of computer program code and hardware (e.g., general purpose and/or specific purpose), which can be developed using standard programming and engineering techniques, respectively.

Figure 5:
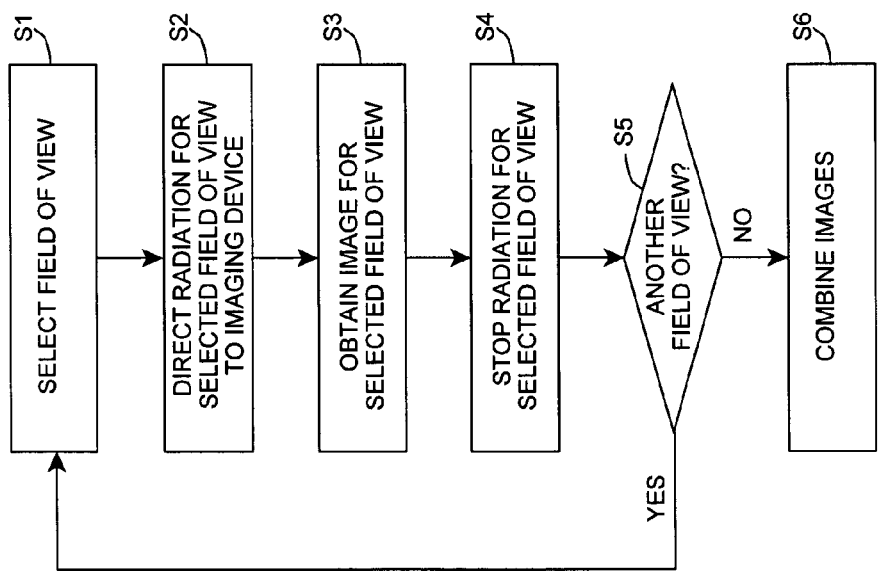
FIG. 5 shows illustrative process steps for generating a panoramic image according to an embodiment of the invention.

In any event, FIG. 5 shows illustrative process steps for generating a panoramic image, which can be implemented by the various systems of imaging system 10 (FIG. 1), according to an embodiment of the invention. In general, the processing of images when generating a panoramic image is similar to that used to generate a panoramic image using a rotating camera. However, in the present invention, imaging device 46 (FIG. 2A) remains stationary while obtaining the images thereby avoiding the potential introduction of errors due to wear, vibration, and the like. Referring to FIGS. 1 and 5, in step S1, selection system 14 can select a first field of view. In step S2, view system 12 can direct electromagnetic radiation for the selected field of view to an imaging device 46 (FIG. 2A). To this extent, step S2 can include opening a shade for an opening that corresponds to the selected field of view, after which the electromagnetic radiation can be directed by various reflective surfaces in view system 12 to imaging device 46. In step S3, generation system 16 obtains an image for the selected field of view. In step S4, view system 12 stops the radiation from the selected field of view by, for example, closing the shade for the opening. In step S5, selection system 14 determines whether another field of view is to be included in the panoramic image. If so, then flow returns to step S1 where the next field of view is selected.

Figure 6:
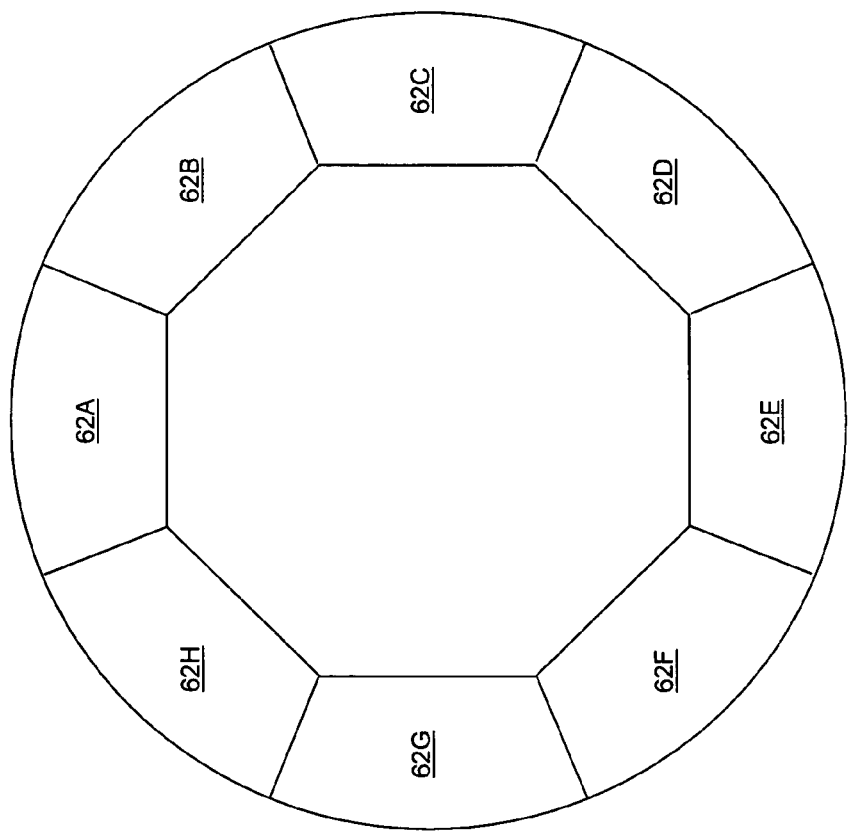
FIG. 6 shows an illustrative full panoramic image that comprises a combination of images for eight fields of view.

Once an image has been obtained for each field of view to be included in the panoramic image, then flow proceeds to step S6, in which generation system 16 combines the images for the fields of view to generate the panoramic image in a known manner. For example, FIG. 6 shows an illustrative full panoramic image 60 that comprises a combination of images 62A-H for eight fields of view. Each image 62A-H can be appended (e.g., connected, stitched) using any solution. While panoramic image 60 is shown as a full panoramic image (i.e., three hundred sixty degrees), it is understood that panoramic image 60 could comprise only a portion thereof. Further, it is understood that the process steps of FIG. 5 are only illustrative of various process steps that can be implemented to generate panoramic image 60. For example, in an alternative embodiment, after obtaining an image for the second and each subsequent field of view, the new image can be appended to the previously obtained image(s) rather than combining all images after they all have been obtained.

The invention described herein provides numerous advantages over other imaging solutions. For example, each shade 34A-C (FIG. 2B) can be independently operated, thereby enabling any desired field of view in the full panorama to be viewed/imaged at any time without the need to pass through/view any intervening field of view. However, in applications in which this is not necessary, such as a constant scan of a perimeter, the configuration shown and discussed with reference to FIGS. 3A-B can be used, thereby simplifying the required control functionality.

In an illustrative embodiment, the full panorama is covered using twelve fields of view as shown in FIGS. 2A-B. However, any desired number of fields of view can be used. With a larger number of fields of view, a smaller portion of the full panorama can be imaged at any given time. Consequently, for a particular imaging device 46 (FIG. 2A) or viewing arrangement, the effective resolution and/or detail can increase with the number of fields of view. It is understood that the various fields of view can be along a horizontal panorama, a vertical panorama, or some combination thereof. For example, differing reflective paths in imaging device 46 can be configured to provide a mostly horizontal panorama, but view down/up for a portion of the panorama due to the surrounding terrain (e.g., a cliff, a hill, etc.). Further, by selecting appropriate optics, such as the various reflective surfaces, objective lens, etc., shown and discussed herein, and sufficiently narrow fields of view, the invention also avoids the distortions of image common to wide-angle lenses and wide-angle catadioptric systems. Still further, the use of only a single, stationary objective lens 44 (FIG. 2A) reduces any difficulty with multiple points of view, such as when combining two or more images to generate the panoramic image.

Additionally, various modifications and/or additions can be made to the illustrative imaging system shown and discussed herein based on a particular application. For example, the imaging system can include an image intensifier or the like. Further, a size of the reflective surfaces, shades and/or openings can be varied when a level of interest/need for detail is not equal across the full panorama. To this extent, in one embodiment, the imaging system can be used as a security camera that is adjacent a building. In this case, areas outward from the building have a higher potential interest at longer distances from the building, thereby necessitating more detailed coverage and thus more fields of view as compared to areas near the building, which may be imaged with much less division and still yield sufficient detail for security monitoring purposes. Further, in an application such as a perimeter security application, two or more imaging systems could be implemented together, in which one provides a constant panoramic scan while the other can target individual areas of interest. This would enable a user to examine an area with a potential intruder more closely while still maintaining a full perimeter scan. It is understood that these modifications and applications are only illustrative of numerous such modifications and applications as will be recognized by one in the art.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of directing electromagnetic radiation from at least one of a plurality of fields of view to a view point, the method comprising:
   providing a casing having a plurality of openings each having a shade to selectively allow electromagnetic radiation to pass therethrough, wherein each of the plurality of openings corresponds to one of the plurality of fields of view;
   selectively opening one or more shades to pass electromagnetic radiation from a field of view through a corresponding opening;
   directing electromagnetic radiation passing through each selected opening onto a first reflective surface; and
   directing electromagnetic radiation reflected off of the first reflective surface to the view point, wherein the view point comprises a transparent portion of the first reflective surface.

2. The method of claim 1, wherein the selectively opening further includes opening a shade for an opening that corresponds to the selected at least one of the plurality of fields of view.

3. The method of claim 1, wherein the selectively opening further includes rotating a ring comprising at least one opening so that the at least one opening aligns with an opening of the casing that corresponds to the selected at least one of the plurality of fields of view.

4. The method of claim 1, further comprising adjusting a level of detail for the selected at least one of the plurality of fields of view.

5. The method of claim 1, further comprising directing the reflected electromagnetic radiation towards an imaging location having an imaging device.

6. The method of claim 5, further comprising projecting the reflected electromagnetic radiation onto the imaging device to form an image for each of the selected at least one of the plurality of fields of view.

7. The method of claim 6, further comprising combining each of the images generated from the selected at least one of the plurality of fields of view to generate a panoramic image.

8. A system for directing electromagnetic radiation from at least one of a plurality of fields of view to a view point, the system comprising:
   a casing having a plurality of openings each having a shade to selectively allow electromagnetic radiation to pass therethrough, wherein each of the plurality of openings corresponds to one of the plurality of fields of view;
   means for selectively opening one or more shades to pass electromagnetic radiation from a field of view through a corresponding opening;
   means for directing electromagnetic radiation passing through each selected opening onto a concave reflective surface; and
   a convex reflective surface for directing electromagnetic radiation reflected off of the concave reflective surface to the view point, wherein the view point comprises a transparent portion of the concave reflective surface.

9. The system of claim 8, wherein the shade comprises one of a cover, a shutter, or a liquid crystal panel.

10. The system of claim 8, wherein the casing comprises a rotatable ring.

11. The system of claim 8, wherein a combination of the plurality of fields of view comprises a panoramic field of view.

12. The system of claim 8, further comprising a system for adjusting a level of detail for the at least one of the plurality of fields of view.

13. A method of generating an image, the method comprising:
   providing a casing having a plurality of openings each having a shade to selectively allow electromagnetic radiation to pass therethrough, wherein each of the plurality of openings corresponds to a plurality of fields of view;
   selecting at least one of a plurality of fields of view to image;
   selectively opening one or more shades of the plurality of openings that correspond to the selected at least one of a plurality of fields of view to image to pass electromagnetic radiation therethrough;
   directing electromagnetic radiation passing through each selected orpening onto a first reflective surface;
   directing electromagnetic radiation reflected off of the first reflective surface to a view point, wherein the view point comprises a transparent portion of the first reflective surface; and
   generating the image based on the electromagnetic radiation received from each of the selected at least one of a plurality of fields of view.

14. The method of claim 13, further comprising adjusting a level of detail for the selected at least one of the plurality of fields of view.

15. The method of claim 13, further comprising repeating the directing for each of the selected at least one of the plurality of fields of view to generate the image.

16. The method of claim 13, wherein the generating of the panoramic image comprises combining each of the images generated from the selected at least one of the plurality of fields of view.

17. A panoramic imaging system comprising:
   a casing having a plurality of openings each having a shade to selectively allow electromagnetic radiation to pass therethrough, wherein each of the plurality of openings corresponds to one of the plurality of fields of view;
   means for selecting at least one of a plurality of fields of view to image;
   means for selectively opening one or more shades to pass electromagnetic radiation from the selected fields of view through a corresponding opening;
   means for directing electromagnetic radiation passing through each selected opening onto a first reflective surface;
   a second reflective surface for directing electromagnetic radiation reflected reflected off of the first reflective surface to a view point, wherein the view point comprises a transparent portion of the first reflective surface; and
   means for generating an image based on the electromagnetic radiation received from each of the selected at least one of a plurality of fields of view.

18. The system of claim 17, further comprising means for adjusting a level of detail for the selected at least one of the plurality of fields of view.

19. The system of claim 17, wherein the image generating means comprises means for combining each of the images generated from the selected at least one of the plurality of fields of view.

* * * * *